(12) United States Patent
Gremaud et al.

(10) Patent No.: US 8,549,655 B2
(45) Date of Patent: Oct. 1, 2013

(54) UNIT AND METHOD FOR SECURE PROCESSING OF ACCESS CONTROLLED AUDIO/VIDEO DATA

(75) Inventors: Fabien Gremaud, Chatel-St-Denis (CH); Joel Wenger, Etoy (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 318 days.

(21) Appl. No.: 12/995,003

(22) PCT Filed: May 28, 2009

(86) PCT No.: PCT/EP2009/056505
§ 371 (c)(1),
(2), (4) Date: Nov. 29, 2010

(87) PCT Pub. No.: WO2009/144264
PCT Pub. Date: Dec. 3, 2009

(65) Prior Publication Data
US 2011/0075843 A1    Mar. 31, 2011

(30) Foreign Application Priority Data
May 29, 2008    (EP) ..................... 08157227

(51) Int. Cl.
*G06F 7/04* (2006.01)
(52) U.S. Cl.
USPC .................... 726/27; 726/26; 726/28; 726/29
(58) Field of Classification Search
None
See application file for complete search history.

(56) References Cited

U.S. PATENT DOCUMENTS

| | | |
|---|---|---|
| 5,029,207 A | 7/1991 | Gammie |
| 5,689,565 A | 11/1997 | Spies et al. |

(Continued)

FOREIGN PATENT DOCUMENTS

| | | |
|---|---|---|
| EP | 1 078 524 | 11/1999 |
| EP | 1 421 789 | 12/2002 |

(Continued)

OTHER PUBLICATIONS

U.S. Appl. No. 12/971,878 Nov. 28, 2012 for Aug. 3, 2012 to Nov. 28, 2012.

(Continued)

*Primary Examiner* — Pramila Parthasarathy
(74) *Attorney, Agent, or Firm* — DLA Piper LLP US

(57) ABSTRACT

Unit for secure processing access controlled audio/video data capable of receiving control messages (ECM) comprising at least one first control word (CW1) and first right execution parameters (C1), at least one second control word (CW2) and second right execution parameters (C2), said processing unit being connected to a first access control device (CA1), said processing unit is characterized in that it comprises: —means for verifying and applying the first right execution parameters (C1) in relation to the contents of a memory (M1) of said first access control device (CA1) and means for obtaining the first control word CW1, —a second access control device (CA2) integrated into the processing unit UT including means for verifying and applying the second right execution parameters (C2) in relation to the contents of a memory (M2) associated to said second access control device (CA2) and means for obtaining the second control word (CW2), —a deciphering module (MD) capable of deciphering, sequentially with the first and the second control word (CW1) and (CW2), the access controlled audio/video data, said control words (CW1) and (CW2) being provided by the first and second access control devices (CA1, CA2) and stored in said deciphering module (MD). A method for secure processing digital access controlled audio/video data carried out by said unit is also an object of the present invention.

13 Claims, 3 Drawing Sheets

(56) References Cited

U.S. PATENT DOCUMENTS

| | | |
|---|---|---|
| 7,043,020 B2 | 5/2006 | Maillard et al. |
| RE39,166 E | 7/2006 | Gammie |
| 7,720,351 B2 | 5/2010 | Levitan |
| 2002/0126844 A1 | 9/2002 | Rix et al. |
| 2004/0098603 A1 | 5/2004 | Corinne |
| 2005/0055551 A1* | 3/2005 | Becker et al. ............ 713/171 |
| 2006/0083371 A1 | 4/2006 | Duval et al. |
| 2006/0109982 A1 | 5/2006 | Puiatti et al. |
| 2006/0117392 A1 | 6/2006 | Courtin et al. |
| 2006/0123246 A1 | 6/2006 | Vantalon et al. |
| 2007/0169173 A1 | 7/2007 | Brown et al. |
| 2007/0223695 A1 | 9/2007 | Beun et al. |
| 2007/0250912 A1 | 10/2007 | Rassool et al. |
| 2007/0253551 A1 | 11/2007 | Guillot et al. |
| 2007/0286422 A1 | 12/2007 | Cocchi et al. |
| 2008/0080711 A1 | 4/2008 | Gagnon et al. |
| 2009/0007240 A1 | 1/2009 | Vantalon et al. |
| 2009/0028328 A1 | 1/2009 | Munsell et al. |
| 2009/0254996 A1 | 10/2009 | Conus et al. |
| 2010/0024043 A1 | 1/2010 | Neau |
| 2010/0169664 A1 | 7/2010 | Danois et al. |
| 2010/0183149 A1 | 7/2010 | Candelore |
| 2010/0299528 A1 | 11/2010 | Le Floch |
| 2011/0058509 A1 | 3/2011 | Wei |
| 2011/0075843 A1 | 3/2011 | Gremaud et al. |
| 2011/0099364 A1 | 4/2011 | Robyr et al. |
| 2011/0238991 A1 | 9/2011 | Schipper |
| 2012/0008781 A1 | 1/2012 | Chevallier et al. |
| 2012/0060034 A1 | 3/2012 | Hutchings et al. |

FOREIGN PATENT DOCUMENTS

| | | |
|---|---|---|
| EP | 1 485 857 | 7/2003 |
| EP | 1 523 188 | 4/2005 |
| EP | 1 703 731 | 9/2006 |
| FR | 2 871 017 | 12/2005 |
| WO | WO 99/57901 | 11/1999 |
| WO | WO 00/13412 | 3/2000 |
| WO | WO 02/102704 | 12/2002 |
| WO | WO 03/050750 | 7/2003 |
| WO | WO 2006/040482 | 4/2006 |
| WO | WO 2009/144264 | 12/2009 |

OTHER PUBLICATIONS

International Search Report issued in International Application No. PCT/EP2009/056505, mailed Sep. 21, 2009.

Written Opinion issued in International Application No. PCT/EP2009/058505, mailed Sep. 21, 2009.

Yvo G. Desmedt, "Threshold Cryptography", 100 European Transactions on Telecommunications and Related Technologies, vol. 5, No. 4, Jul.-Aug. 1994, pp. 35-43.

European Search Report issued in EP 09 17 9559, mailed Mar. 30, 2010.

English language abstract of FR 2 871 017, published Dec. 2, 2005.

English language abstract of EP 1 703 731, published Sep. 20, 2006.

International Search Report issued in PCT/EP2010/069829, dated Jan. 31, 2011.

Written Opinion issued in PCT/EP2010/069829, dated Jan. 31, 2011.

U.S. Appl. No. 12/971,876 Aug. 3, 2012.

U.S. Appl. No. 13/524,756, Aug. 3, 2012.

U.S. Appl. No. 12/971,876 Mar. 11, 2013 for Nov. 28, 2012 to Mar. 11, 2013.

\* cited by examiner

UNIT AND METHOD FOR SECURE PROCESSING OF ACCESS CONTROLLED AUDIO/VIDEO DATA

TECHNICAL FIELD

The present invention relates to the field of units for secure processing of access controlled digital audio/video data. These units are included in different multimedia facilities as for example personal computers, mobile equipments or digital pay television decoders. This invention also describes a method of processing said audio/video data before output towards a peripheral device of a user.

TECHNICAL BACKGROUND

A digital audio/video data processing unit like a digital television decoder or "set top box" includes a main module gathering essential functions for the decryption of the received data, generally called deciphering unit or calculation module. The audio/video data entering the calculation module is encrypted with control words CW transmitted in a control message ECM stream associated with the audio/video data stream. The calculation module includes a particular circuit in charge of extracting the control words CW from the control messages ECM and decrypting them using keys made available by the processing unit and/or by a security module associated to said unit.

A security module is a device considered as tamper-proof containing different encryption/decryption keys, information used for identifying a user on a network and data which define rights acquired by the user for the reception of a broadcast audio/video data stream. The security module can be in different forms like a removable smart card inserted in a reader, an integrated circuit soldered onto a motherboard, a SIM type card (Subscriber Identity Module) as inserted in most mobile equipment.

The document EP1485857B1 describes a method for matching a decoder with a removable security module. The system formed by the decoder and the security module receives digital audio/video data encrypted by a control word and control messages ECM containing the encrypted control word. A first key is assigned to the decoder and a second key to the security module. These two keys form a unique pair in the broadcast network of the audio/video data. Only one key of the key pair can be chosen arbitrarily while the other is determined according to the first key in a way that the combination of these two keys conforms to a pairing key of the system, thus allowing to decrypt the control word.

The document EP1421789B1 describes a process of controlling access to encrypted data transmitted by an operator to a plurality of subscribers groups. Each group has a group key and each subscriber receives from the operator an operating key encrypted by the group key to decipher the transmitted data. The process consists of associating the operating key encrypted with the group key to a random value for generating a secret code. This code is transmitted via a management message EMM to the subscribers to calculate the operating key at the reception of the random value transmitted by control messages ECM. The process uses only one access control and it allows for dissuading the publication of the operating keys by making them dependent on the subscriber group.

The document EP1078524B1 describes a coupling or matching method in order to make a security module dependent on the host apparatus, in this case a Pay-TV decoder, and vice versa. The aim of this matching mechanism is to protect the communications between the security module and the decoder in order to prevent the capture, from the transmission channel, of the control words allowing deciphering the transmitted program data. The matching allows also to prevent the use of the security module with a foreign host apparatus or conversely. The solution uses a unique key or a unique key pair to encrypt and decrypt the data exchanged between the security module and the decoder. This unique key is maintained secret and unchanged during the whole life of the related devices. One or other of the connected devices can verify, at any moment, the validity of the matching parameters and take appropriate counter measures when a match is not found.

The document WO2006/040482 describes a method of recomposing a control word on the one hand by a security module and on the other hand by a decoder. Neither of the two devices can obtain alone the complete control word. The message including the two parts of the control word moreover contains two access conditions, one for the security module and the other for the decoder.

SUMMARY OF THE INVENTION

The aim of the present invention is to overcome the lack of security by using a counterfeited security module in a processing unit of encrypted audio/video data. The processing unit including a secured transmission link for control words using a pairing mechanism between the security module and the processing unit.

This aim is achieved by a method for secure processing of access controlled audio/video data by a processing unit receiving control messages comprising at least one first control word and first right execution parameters, at least one second control word and second right execution parameters, said processing unit being connected to a first access control device, the method is characterized by the steps of:
- verifying and applying the first right execution parameters in relation to the contents of a memory of said first access control device, and when the verification is positive, obtaining and transmitting the first control word to a deciphering module of access controlled audio/video data integrated in the processing unit, storing said first control word in said deciphering module in view of access to audio/video data,
- transmitting, by the first access control device, the second control word and of the second right execution parameters to a second access control device integrated in the processing unit,
- verifying and applying, by the second access control device, the second right execution parameters in relation to the contents of a memory associated to said second access control device, and when the verification is positive, obtaining and loading the second control word into the deciphering module of access controlled audio/video data,
- deciphering, by the deciphering module, the access controlled audio/video data by using sequentially the first and the second control word.

The security or control message does not only contain control words but also right execution parameters destined on the one hand to the first access control device formed in general by a security module and on the other hand to the second access control device formed in general by a calculation module integrated into the processing unit. Thus, two security devices allow obtaining, by the application of the respective right execution parameters, the control words necessary for deciphering the access controlled audio/video data.

According to an embodiment, the second right execution parameters of the security message comprise instructions and parameters indicating, to the memory associated to the calculation module, a reference to a register containing a key. The latter allows determining the second control word.

The main advantage of the method according to the invention is that the security of the control words is managed at the same time by the security module and by the calculation module thanks to keys retrieved from the memory. These keys can by the way be regularly renewed by a management center or network head end by means of managing messages either for individual processing units or for a predetermined group of processing units.

The object of the present invention also concerns a unit for secure processing access controlled audio/video data capable of receiving control messages comprising at least one first control word and first right execution parameters, at least one second control word and second right execution parameters, said processing unit being connected to a first access control device, said processing unit is characterized in that it comprises:
- means for verifying and applying the first right execution parameters in relation to the contents of a memory of said first access control device and means for obtaining the first control word,
- a second access control device integrated into the processing unit including means for verifying and applying the second right execution parameters in relation to the contents of a memory associated to the said second access control device and means for obtaining the second control word,
- a deciphering module capable of decoding, sequentially with the first and the second control word, the audio/video data with controlled access, said control words being provided by the first and second access control devices and stored in said deciphering module.

BRIEF DESCRIPTION OF THE DRAWINGS

The invention will be better understood thanks to the following detailed description which refers to the enclosed drawings given as non limitative examples.

DETAILED DESCRIPTION OF THE INVENTION

Figure 1:
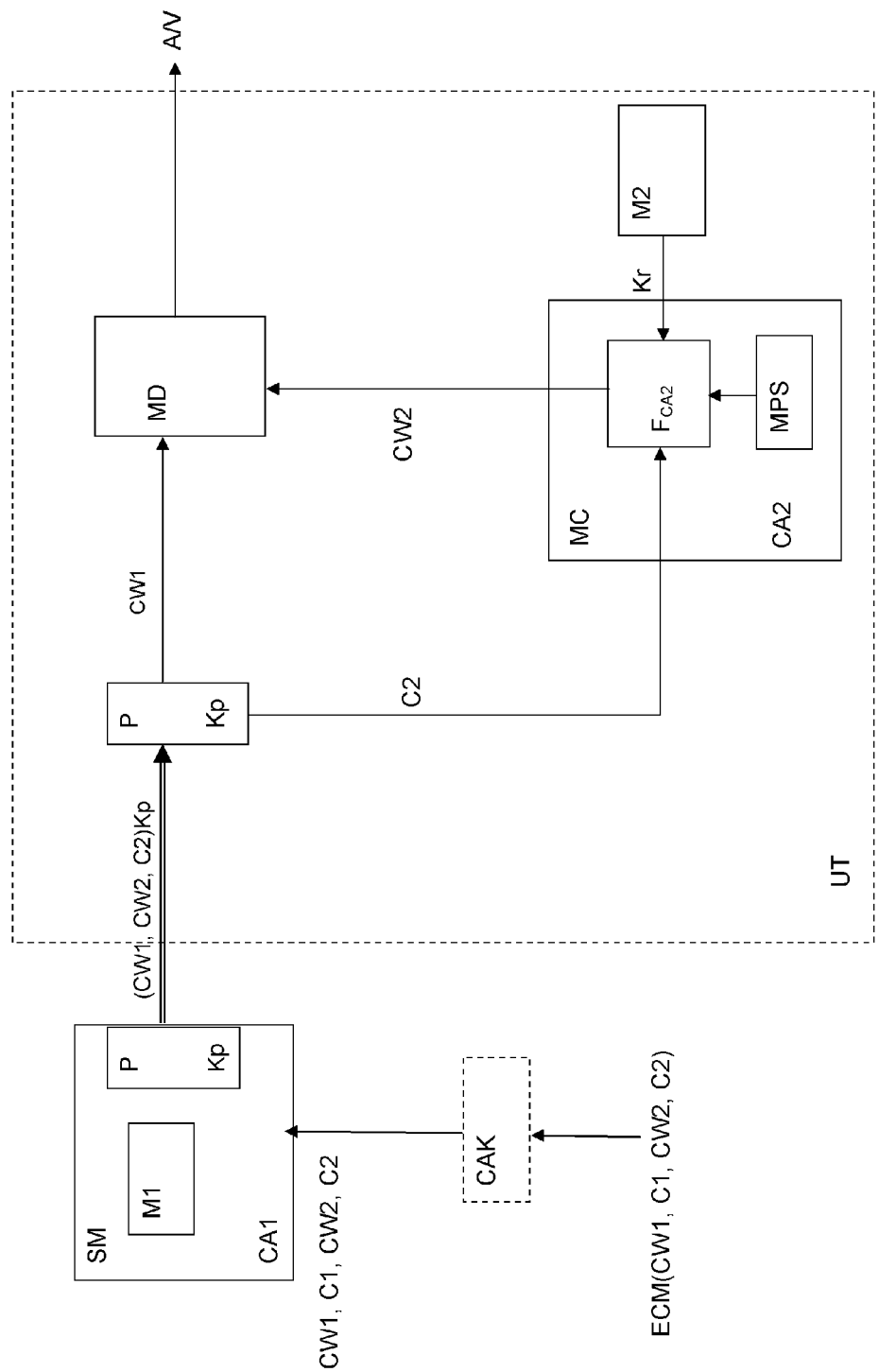
FIG. 1 shows a block-diagram of a configuration of a processing unit receiving a security message comprising a first control word and first right execution parameters processed by a security module and a second control word and second right execution parameters processed by the second access control device.

The processing unit represented by the block diagram of FIG. 1 shows an example of a configuration with a security module (SM) consisting of a device considered as tamper-proof containing different encryption/decryption keys, information for identifying a user on a network and data defining rights acquired by the user for the reception of broadcast audio/video data. The security module can be in different forms like a removable smart card with or without contacts, inserted into a reader, an integrated circuit welded on a motherboard, a SIM type card (Subscriber Identity Module), as inserted in most mobile equipments or further in form of a software and/or hardware module lodged in a chipset.

The security module (SM) acts as a first access control (CA1) for the encrypted digital data and a calculation module (MC) integrated into the processing unit acts as a second access control (CA2) for the same data. The calculation module (MC) is controlled by a secured driver module (MPS) implemented either in software form or in hardware form or in a hybrid hardware and software form. This secured calculation module (MC) is associated with a memory M2 containing for example a key (Kr) intervening in the determination of the second control word (CW2).

The processing unit further includes a deciphering module (MD) capable of deciphering, sequentially with the first and the second control word (CW1) and (CW2), the access controlled audio/video data. These control words (CW1, CW2) provided by the first and second access control devices (CA1, CA2) are loaded i.e. temporarily stored in order to be used for deciphering the audio/video data and obtaining these data (NV) in clear form at the output of the processing unit.

According to a first embodiment, the control message ECM contains a first control word (CW1), first right execution parameters (C1), a second control word (CW2) and second right execution parameters (C2). The control message ECM (CW1, C1, CW2, C2) is in general encrypted with a transmission key known to the security module (SM). A hardware and software central access control module CAK (Control Access Kernel) included in the processing unit (UT) and linked in particular to the security module (SM) filters the control messages ECM out from the broadcast digital audio/video data stream in order to forward them towards the security module (SM).

The first right execution parameters (C1) appear in general in form of rights necessary to the user for accessing one or more broadcast audio/video data streams. These rights consist of codes, which indicate a subscription, an authorization for an event or a validity period of the access, etc.

The security module (SM) decrypts the control message (ECM) with the transmission key and verifies the concordance of the rights associated with the first right execution parameters C1 with the rights stored in a memory (M1) of the security module (SM). If the verification of the rights has been carried out successfully, the security module (SM) extracts from the control message ECM a block comprising the first control word (CW1), the second control word CW2 and the second right execution parameters (C2). This block is preferably encrypted with a pairing key (Kp) of a pairing or matching mechanism P as described for example in the document EP1078524B1, which key is known by the security module and the processing unit (UT). The latter receives the block via a channel thus secured by the matching, then decrypts it with the pairing key (Kp). The first control word (CW1) extracted from the block is determined by the first access control device (CA1) i.e. validated by the security module (SM) and destined to the deciphering module (MD).

It should be noted that the first control word CW1 can also be calculated by the security module (SM) starting from a cryptogram representative of this first control word CW1 by means of a mathematical function and/or an algorithm and/or other data contained in the memory M1 of said security module (SM).

The second right execution parameters C2 also extracted from the block are forwarded towards the calculation module (MC). They contain for example instructions indicating to the calculation module (MC), by means of the secured driver module (MPS) and the memory M2, the way to obtain the second control word CW2.

According to a preferred configuration, in the control message ECM, the set formed by the first control word CW1 and the first right execution parameters (C1) is encrypted by a key K1 of the first access control device CA1 or security module SM.

In a similar way, the set formed by the second control word CW2 and the second right execution parameters (C2) is encrypted by a key K2 of the second access control device CA2 or calculation module (MC).

Depending on the configurations, either one or other of these sets or each of the two sets is encrypted with a key of the respective access control devices that process these sets.

According to a further embodiment, several control words associated either to one or other or to both access control devices CA can be transmitted in a control message ECM. The right execution parameters can be individually associated to each control word or to a group of specific control words and to be processed by either one or other of the access control devices. For example, in the message ECM1(CW1, CW2, CW3; C123, CW4, CW5, C45), the control words CW1, CW2, CW3 will be processed by the security module (SM) by applying the rights execution parameters C123, while the control words CW4, CW5 will be processed by the second access control device integrated into the multimedia unit by applying the parameters C45.

Figure 3:
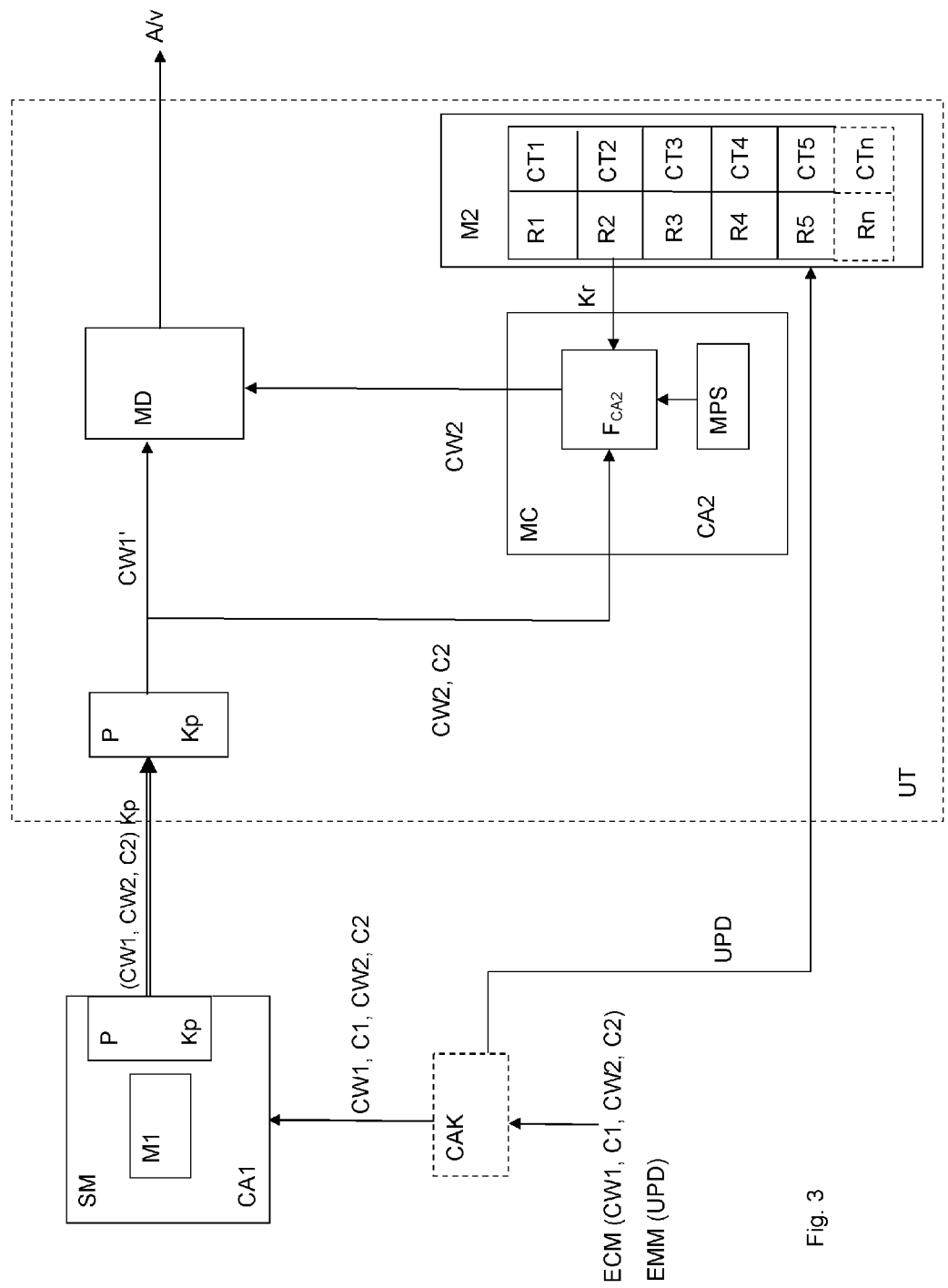
FIG. 3 shows another alternative of the configuration of the processing unit with an example of a memory comprising registers associated to counters containing keys updated by management messages. The processing unit receives security messages comprising at once the first and second control words and the first and second right execution parameters.

According to an example of a memory illustrated by FIG. 3, the second right execution parameters C2 are applied, then processed by the secured driver module (MPS) associated with the calculation module (MC). The secured driver module (MPS) will, according to the instructions included in the parameters C2, extract one or more keys (Kr) of one or several registers (R1, R2, ... Rn) designated by the instructions. The second control word (CW2) is then formed by applying a function or an algorithm whose characteristics also result from the parameters C2 on the key or the keys Kr retrieved from one or several registers (R1, R2, ... Rn).

Other ways to obtain the second control word (CW2) are also conceivable. They depend in particular on the structure of the memory M2 associated with the calculation module (MC) and on the storage mode of the keys. According to another example, a key can be determined by means of a pointer table indicating memory addresses of keys or other pointers directed towards addresses in the memory where the key or the keys are stored. A tree structure including several branches thus allows memory addresses to be defined where key portions or complete keys are stored. The instructions comprised in the second right execution parameters C2 contain the necessary data for defining the key or the keys starting from one or more addresses pointer tables of the memory M2.

Figure 2:
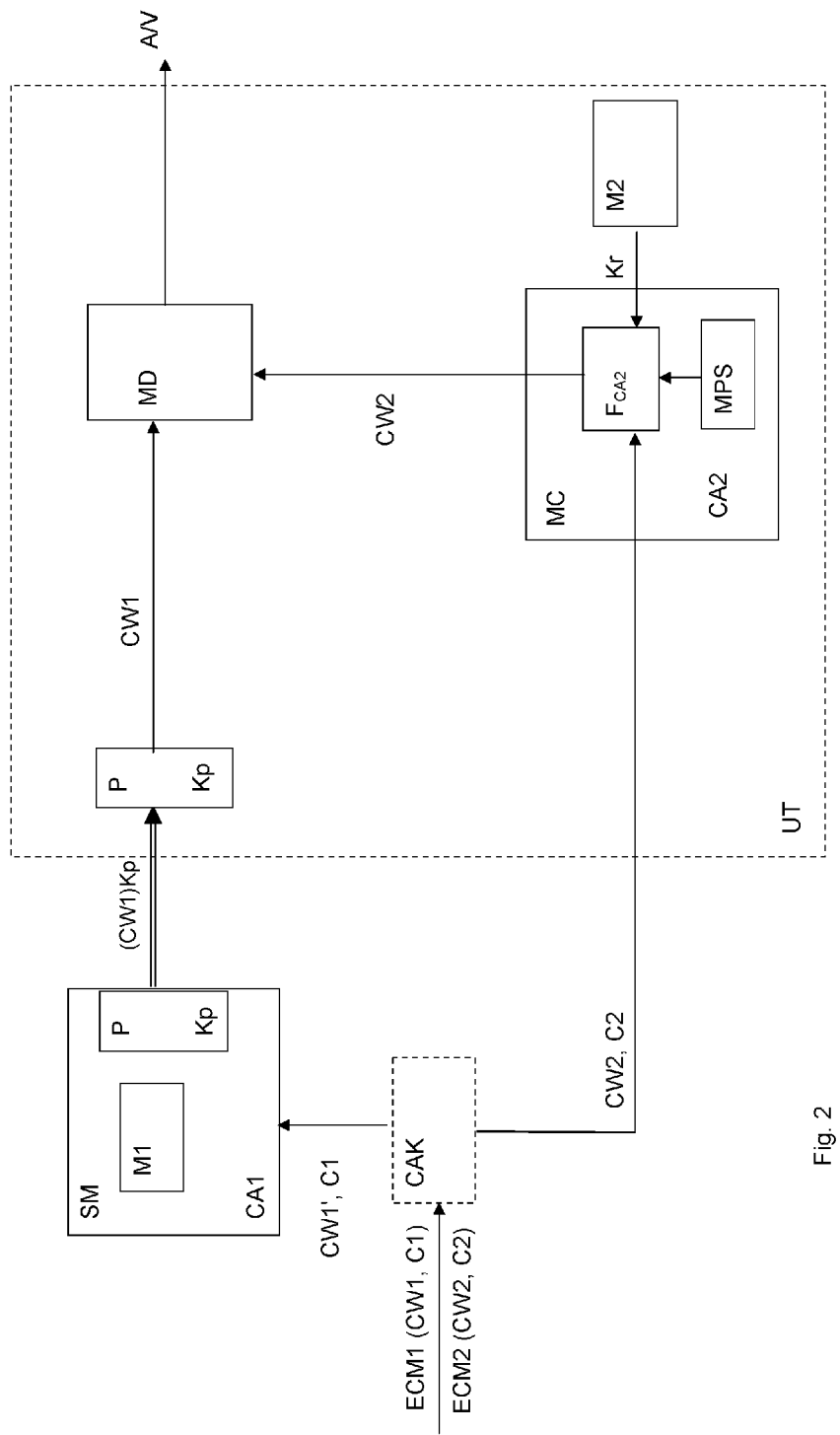
FIG. 2 shows an alternative of the configuration of the processing unit of FIG. 1. The processing unit receives a first security message comprising a first control word and first right execution parameters and a second security message comprising a second control word and second right execution parameters.

FIG. 2 shows an embodiment in which the processing unit receives, on the one hand, control messages ECM1 containing a first control word CW1 and the first right execution parameters C1 and on the other hand control messages ECM2 containing a control word CW2 and the second right execution parameters C2. The hardware and software central access control module CAK directs the control messages ECM1 and ECM2 in order to forward the first control word CW1 and the first right execution parameters C1 towards the security module (SM) and the second control word CW2 and the second right execution parameters C2 towards the calculation module (MC) of the second access control device (CA2). In this way, the control messages ECM1 and ECM2 enter the processing unit UT by two distinct paths: one towards the calculation module (MC) going through the security module (SM) making up the first access control CA1, and one towards the second access control CA2 without necessarily passing through the security module (SM).

According to an option, several control messages ECM1 ... ECMn may each contain different control words CW1 ... CWn and right execution parameters C1 ... Cn which will be processed by an access control device, either by the security module (SM) or the calculation module (MC). For example, three consecutive messages ECM1, ECM2 and ECM3 with a control word CW1, CW2 and CW3 and corresponding right execution parameters C1, C2, C3 are processed by the security module (SM) and the two following consecutive messages will be processed by the second access control device CA2. Of course, the number of messages to be processed by either one or other of the access control devices can be any number, but predefined by the specifications of the system broadcasting the audio/video data and by those of the multimedia units depending on said broadcasting system.

According to another option, not represented in the FIG. 2, the second control word CW2 and the second right execution parameters C2 can be encrypted with a pairing key (Kp) known to the security module (SM). The processing unit possessing the pairing key (Kp) performs, at reception of the parameters C2 and the control word CW2, the decryption on the way leading towards the second access control device CA2.

The calculation module (MC) then determines the second control word (CW2) using one or more keys (Kr) coming from the memory M2 determined by the second right execution parameters (C2). The first control word CW1 is produced by the security module SM as in the embodiment of FIG. 1. The two control words CW1 and CW2 are forwarded towards the deciphering module (MD) in order to obtain the audio/video data in clear form.

In an access controlled audio/video data stream, the control words change regularly after each crypto-period. According to a preferred configuration, in a sequence of control messages ECM only one of the two control words changes, while the other is kept constant. At the following crypto-period and in the following message, the control word that has not previously changed, changes, while the other is kept constant, and so on. For example, a message ECM1 (CW1, C1, CW2, C2) is followed by a message ECM2(CW2, C2, CW3, C3), then a message ECM3(CW3, C3, CW4, C4) etc. In this sequence of messages, only one control word changes. This configuration proves to be advantageous for facilitating the synchronization of the different encrypted packets formed by the data of the stream and for accelerating their processing by the access control devices. In fact, a control word is memorized during each crypto-period for being used during the following crypto-period.

FIG. 3 shows an embodiment in which the processing unit receives control messages ECM containing at once the first and second control words (CW1, CW2) and the first and second right execution parameters (C1, C2) as in the example of FIG. 1.

The second access control device (CA2) includes a memory M2 structured in a plurality of registers (R1, R2, R3, ... Rn) containing keys and each register is associated to a counter (CT1, CT2, ... CTn).

In the application of the digital pay television, the keys Kr stored in the registers (R1, R2, ... Rn) may be attributed each to a particular set (bouquet) of channels, to a user group owning a given kind of account (R1 standard account, R2 premium account, R3 video on demand VOD, . . . ) or also to a set of programs or specific events (Football World Cup, ski competitions, tennis, etc.).

The granularity or level of detail of the services provided by means of the register keys (Kr) is generally coarser than that provided by the rights stored in the security module (SM). These rights may limit, for example, a viewing duration of programs accessible to a user owning a standard account to which access is authorized by the register key R1.

The keys of the registers (Kr) can be renewed via a management message EMM transmitted to the security module (SM) via the central hardware and software access control module CAK for the update of the rights.

In a first embodiment, the message EMM contains a parameter allowing the changing of all the register keys according to the rights stored in the memory M1 of the security module (SM). According to a particular implementation, the parameter is transmitted via a connection secured with a pairing key in the same way as the control words and the rights execution parameters of the control messages ECM.

In an embodiment where the security module (SM) does not intervene, the updates UPD contained in the management message EMM are forwarded directly by the central hardware and software access control module CAK towards the memory M2. This transfer of the updates UPD towards the memory M2 can also be secured with a pairing key known by the security module.

The calculation module (MC) obtains the second control word CW2 by combination of a cryptogram representative of the second control word CW2 provided by the control message ECM and of one or several register keys (Kr) determined by the second right execution parameters (C2). The latter can moreover contain instructions related to a function or an algorithm ($F_{CA2}$) to be applied on the register key or keys (Kr). The function or the algorithm ($F_{CA2}$) may be of the type XOR (exclusive OR), TDES (Triple Data Encryption Standard), IDEA (International Data Encryption Algorithm), RSA (Rivest Shamir Adleman) with asymmetric keys, or other.

In the configuration of FIG. 3, a counter (CT1, CT2, . . . CTn) associated with a register is either incremented or decremented each time that a key is extracted from the register to calculate the final second control word CW2. When the counter (CT1, CT2, . . . CTn) reaches a predetermined maximum value after incrementation or zero after decrementation from a predetermined value, the access to the register is no longer possible and stops the production of the control word CW2.

In an example of a memory M2 including 8 registers, there is the possibility of creating 256 groups going from 0 (00000000), using the key 0, to 255 (11111111), using the key 255. When a processing unit joins the group 3 (00000011) using, for example, the key 3 corresponding to a standard account with possibility to view the football matches, the management center transmits key 3 to this unit. With each use of a register (R1, R2, . . . , Rn), the counter (CT1, CT2, . . . CTn) is decremented or incremented.

A counter (CT1, CT2, . . . CTn) is reinitialized, i.e. reset to maximum or to zero, at the time of each renewal of the key (Kr) of the corresponding register.

When the register key (Kr) is not changed, a specific management message EMM, transmitted either by means of the security module (SM) or directly to the secured driver module (MPS), may also reset the counter.

Generally, the register keys (Kr) are renewed with a determined frequency in order to prevent the counters (CT1, CT2, . . . CTn) from reaching their maximal value, or zero.

When the unit leaves, for example, the group 3 (00000011) to join the group 1 (00000001) corresponding to the standard account only, the management centre transmits the key 1 to this unit. The key 3 remains stored in the corresponding register of the memory M2 and its use is authorized as long as the value of the associated counter is below its maximal value or different to zero, respectively. At the moment of renewal of the key 1, only the counter of the register 1 is reset while the counter of the register 3 continues to be decremented or incremented until exhausted. A register with a counter that is not reinitialized remains inactive and an update of the corresponding key cannot be carried out. The key 3 is thus revoked and can be reactivated by a reinitialization message targeted to the concerned counter.

A revoked key, i.e. coming from a register where the value of the counter is maximum or zero, cannot be used to calculate a control word CW. In this case the processing unit or rather the secured driver module (MPS) may generate an error message leading to reinitialize the counter or counters of the related registers.

In a key's global renewal mode, it is possible to transmit a message encrypted by a pairing key containing all the register keys. The secured driver module (MPS) will nevertheless reload the registers which are active, i.e. with a counter which has not reached the maximum value. The other registers are thus not reloaded because they are not used. This way of global reloading allows, with only one message, for the modifying of all the active registers in the processing units.

The activation of the counters i.e. the reset to zero will preferably pass by the security module (SM) and will be individually addressed to each processing unit. According to a particular implementation, all the counters are at their maximum value by default.

The invention claimed is:

1. A method for secure processing of access controlled audio/video data by a processing unit receiving control messages, the control messages comprising at least one first control word and first right execution parameters, at least one second control word and second right execution parameters, said processing unit being connected to a first access control device, the method comprising the steps of:
    verifying, by the first access control device, the first right execution parameters by comparison with rights stored in a memory associated to said first access control device and when the verification is successful;
    extracting from the control message a block comprising the first control word, the second control word and the second right execution parameters;
    obtaining and transmitting the first control word to a deciphering module of access controlled audio/video data integrated into the processing unit; storing said first control word in said deciphering module;
    transmitting, by the first access control device, at least the second right execution parameters to a second access control device integrated into the processing unit;
    executing, by the second access control device, instructions included in the second right execution parameters using data stored in a memory associated to said second access control device to obtain the second control word;
    storing the second control word in the deciphering module; and
    deciphering, by the deciphering module, access controlled audio/video data packets by using the first control word during a crypto-period and the second control word during a following crypto-period.

2. The method according to claim 1, wherein the second right execution parameters apply to data stored in the memory of the second access control device, in a form of a plurality of registers, each containing a register key, the second control word being determined by applying a function or an algorithm resulting from said second right execution parameters on at least one register key designated by the instructions included in the second right execution parameters.

3. The method according to claim 2, wherein the registers, each including a counter that increases or decreases at each use of a key coming from the corresponding register.

4. The method according to claim 3, wherein the access to the key of the corresponding register is blocked preventing the obtaining of the second control word when the value of a counter of a register reaches a predetermined maximal value or zero.

5. The method according to claim 2, further comprising updating the register keys using management messages transmitted by a management center connected to the processing unit.

6. The method according to claim 5, wherein updating the register keys further includes a step of reinitializing a counter associated to each register, said counter increases or decreases at each use of a key coming from the corresponding register.

7. The method according to claim 2, wherein the register keys are transmitted using management messages processed by the first access control device according to the rights stored in the memory of said first access control device.

8. The method according to claim 1, wherein the control messages are encrypted by a pairing key known by the first access control device.

9. The method according to claim 1, wherein a set formed by the first control word and the first right execution parameters is encrypted by a key of the first access control device.

10. The method according to claim 1, wherein a set formed by the second control word and the second right execution parameters is encrypted by a key of the second access control device.

11. A processing unit configured for secure processing of access controlled audio/video data and adapted to receive control messages, said control messages comprising at least one first control word and first right execution parameters, at least one second control word and second right execution parameters, said processing unit being connected to a first access control device, said processing unit comprising:
   a first access control device, configured for verifying the first right execution parameters with rights stored in a memory associated to said first access control device, and for obtaining the first control word, when the verification is successful;
   a second access control device configured for receiving at least the second right execution parameters, for executing instructions included in the second right execution parameters using data stored in a memory associated to said second access control device, and for obtaining the second control word; and
   a deciphering module of access controlled audio/video data configured for receiving and storing the first control word and the second control word, and for deciphering access controlled audio/video data packets by using the first control word during a crypto-period and the second control word during a following crypto-period.

12. The processing unit according to claim 11, wherein the first access control device is formed by a security module configured for supplying the first control word, the second access control device is formed by a calculation module and by a memory comprising a plurality of registers, each containing a register key for determining the second control word by using an algorithm or function of the calculation module, said calculation module being configured for loading the first control word and the second control word into the deciphering module.

13. The processing unit according to claim 12, wherein the registers each include a counter that increases or decreases at each use of a key coming from the corresponding register.

* * * * *